United States Patent
Liu et al.

(10) Patent No.: US 9,328,221 B2
(45) Date of Patent: May 3, 2016

(54) METHOD FOR PREPARING GRAPHENE OXIDE/WHITE CARBON BLACK/RUBBER NANOCOMPOSITE MATERIAL

(71) Applicant: BEIJING UNIVERSITY OF CHEMICAL TECHNOLOGY, Beijing (CN)

(72) Inventors: Li Liu, Beijing (CN); Yingyan Mao, Beijing (CN); Fazhong Zhang, Beijing (CN); Shipeng Wen, Beijing (CN); Yong Ma, Zhaoyuan (CN); Tao Xing, Zhaoyuan (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 0 days.

(21) Appl. No.: 14/326,456

(22) Filed: Jul. 8, 2014

(65) Prior Publication Data

US 2014/0323610 A1    Oct. 30, 2014

Related U.S. Application Data

(63) Continuation-in-part of application No. PCT/CN2012/086520, filed on Dec. 13, 2012.

(30) Foreign Application Priority Data

Feb. 23, 2012  (CN) .......................... 2012 1 0043388

(51) Int. Cl.
| | |
|---|---|
| *C08K 3/04* | (2006.01) |
| *C08K 9/02* | (2006.01) |
| *C08K 3/36* | (2006.01) |
| *C08J 3/22* | (2006.01) |
| *C08K 9/06* | (2006.01) |

(52) U.S. Cl.
CPC ... *C08K 9/02* (2013.01); *C08J 3/22* (2013.01); *C08K 3/04* (2013.01); *C08K 3/36* (2013.01); *C08K 9/06* (2013.01)

(58) Field of Classification Search
CPC ..................................... C08K 3/04; C08K 3/36
USPC .......................................... 523/351, 319, 323
See application file for complete search history.

(56) References Cited

U.S. PATENT DOCUMENTS

2010/0096595 A1*  4/2010  Prud'Homme ........ B82Y 30/00
                                                                252/500

\* cited by examiner

*Primary Examiner* — Edward Cain
(74) *Attorney, Agent, or Firm* — Matthias Scholl, PC; Matthias Scholl

(57) ABSTRACT

A method for preparing a graphene oxide/white carbon black/rubber nanocomposite material is described. The prepared graphene oxide/white carbon black/rubber nanocomposite material contains nanoscale graphene oxide and white carbon black that are highly dispersed. The nanocomposite material has a relatively high modulus, excellent wear resistance and tear resistance, a relatively low rolling resistance, and at the same time has a low air-permeability and excellent self-healing capability.

30 Claims, No Drawings

METHOD FOR PREPARING GRAPHENE OXIDE/WHITE CARBON BLACK/RUBBER NANOCOMPOSITE MATERIAL

CROSS-REFERENCES TO RELATED APPLICATIONS

This application is a continuation-in-part of International Patent Application No. PCT/CN2012/086520 with an international filing date of Dec. 13, 2012, designating the United States, now pending, and further claims priority benefits to Chinese Patent Application No. 201210043388.4 filed Feb. 23, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

1. Field of the Invention

The present invention relates to a method for preparing a graphene oxide/white carbon black/rubber nanocomposite material that is completely peeled off, highly dispersed, and of strong interfacial bond strength and, more particularly, to a method of employing combination of emulsion mixing and flocculation, combination of emulsion mixing and spray drying, or mechanical blending to prepare a graphene oxide/white carbon black/rubber nanocomposite material.

2. Description of the Related Art

In rubber industry, carbon black is the most important reinforcing filler in rubber industry. The application of carbon black, however, is being challenged because the production thereof is completely dependent on the decreasing oil reserves. One of the successful alternatives to carbon black produced from non-oil sources is white carbon black, as referred to as amorphous hydrated silica or silica gel ($SiO_2 \cdot nH_2O$). It is white, non-toxic, amorphous fine power with a primary particle size of 10-40 nm. White carbon black is porous, electrically insulative, and of large internal surface area, high dispersibility, lightweight, excellent chemical stability, high-temperature resistance, and incombustibility. White carbon black is composed of monomers, dimers, or trimers formed from structural units that consist of the disorder covalent bonds of —O—Si—O—. It can be used as a filler for rubbers, plastics, synthetic resins, and paints. It can also be used as a lubricant or insulating material. White carbon black's ability of reinforcing rubbers is similar to that of carbon black. Especially, white carbon black after surface modification is able to render rubbers with high moduli and low rolling resistance. However, due to the weak interactivity between white carbon black and rubbers, rubbers become much less resistive to wear after being filled with white carbon black. As a result, though styrene-butadiene rubber filled with white carbon black has been widely used in production of tires of passenger vehicles, the utility of white carbon black in production of tires of heavy and construction vehicles is still limited, no more than improving the tear resistance of the tires by filling a small amount of white carbon black therein. In order to broaden the utility of white carbon black, improving the wear resistance of rubbers filled with white carbon black by adding additional fillers has been researched. A common method of improving the wear resistance of rubber is adding an appropriate amount of carbon black in addition to white carbon black. This method, however, usually requires large amount of carbon black, leads to a higher rolling resistance and low tear resistance of the tires, and is not environmentally friendly.

Graphene is a membrane formed from hexagonal lattice of $sp^2$-hybridized carbon atoms. It is a two-dimensional material with a thickness of one or a few carbon atoms. The periodic structure extending in a plane and the nanoscale thickness of graphene makes it a nanomaterial in macroscopic scale. Because of the high theoretical specific surface area (approximately 2630 $m^2/g$), large aspect ratio (larger than 1000), and good mechanical strength (with a Young's modulus of 1060 GPa) of graphene, it is potential to be used for reinforcing polymer materials.

In this invention, white carbon black for filling rubbers is partially replaced with completely peeled-off graphene oxide. In nanocomposite materials prepared from these rubbers, the interpenetration of graphene oxide and white carbon black hinders the self-aggregation of these two fillers, leading to uniform dispersion thereof in rubbers. Such nanocomposite materials retain the good properties of white carbon black (including high moduli and low rolling resistance) and have dramatically improved wear resistance, moduli, and tear resistance. Meanwhile, the nanocomposite materials are superior over traditional materials for their excellent air-impermeability and self-recovery capability that result from the layer structure and self-recovery capability of graphene oxide. The rubber nanocomposite materials reinforced by graphene oxide and white carbon black can be used in tires, rubber sheets, tapes, rubber rollers, conveyor belts, seals, and aerospace parts. Because of the excellent self-recovery capability and crack resistance of graphene oxide, it can be used in self-recovery materials and highly crack resistant materials.

SUMMARY OF THIS INVENTION

In view of the above-described problems, it is one objective of the invention to provide a method for preparing a graphene oxide/white carbon black/rubber nanocomposite material that is completely peeled off, dispersed, and strongly interfacially bonded. The graphene oxide is not reduced because graphene reduced from graphene oxide inevitably undergoes re-assembly that hinders dispersion of graphene and because reduced graphene is much less compatible to rubber due to the decrease of functional groups on the surface of graphene. The method includes two types: 1) solution mixing method: graphene oxide, white carbon black, and rubber are combined in aqueous phase or solution phase; and 2) mechanical blending method: graphene oxide (or pre-prepared masterbatch of graphene oxide), white carbon black (or pre-prepared masterbatch of white carbon black), and rubber are mixed in a blending machine.

When directly preparing graphene oxide/white carbon black/rubber nanocomposite materials, graphite oxide is dispersed in water or organic solvents and ultrasonicated to obtain completely peeled-off graphene oxide. The large amount of functional groups containing oxygen on the surface of graphene oxide leads to good compatibility between graphene oxide and water or common organic solvents as well as weakened Van der Waals forces between the layers of graphene oxide, which reduces self-aggregation of graphene oxide. Particles of white carbon black are able to suspend in water to form hydrosol of graphene oxide/white carbon black. Rubber is formed into latex and then mixed with the hydrosol of graphene oxide/white carbon black to obtain a mixture emulsion of graphene oxide/white carbon black/rubber. In spray drying approach, the mixture emulsions atomized into tiny drops by spray drying technique. Water is rapidly removed from the drops by a drying medium so as to prepare graphene oxide/white carbon black/rubber nanocomposite material. Because of the remarkably increase of the specific surface area of the drops formed by spray drying, water is rapidly removed from the drops by a drying medium, which causes the highly dispersed phase structure of the mixture emulsion to be retained in the nanocomposite material. In ionic flocculation approach, flocculant is added into the mixture emulsion and stirred to obtain graphene oxide/white carbon black/rubber nanocomposite material.

The masterbatch of graphene oxide is prepared via the emulsion method as described bellow: graphite oxide is dispersed and ultrasonicated in deionized water at 10-2000 kw and 10-20000 Hz for 10 min-6 h to obtain a hydrosol of graphene oxide; a surfactant is added into the hydrosol of graphene oxide and then ultrasonicated for 5 min-5 h or stirred at 50-10000 r/min for 5 min-5 h to obtain a hydrosol of graphene oxide pre-treated by the surfactant; the hydrosol of graphene oxide, or the hydrosol of graphene oxide pre-treated by the surfactant, is mixed with a rubber latex and then ultrasonicated for 10 min-6 h or stirred at 50-10000 r/min for 10 min-6 h to obtain a stable mixture emulsion of graphene oxide/rubber; and the masterbatch of graphene oxide is prepared from the stable mixture emulsion of graphene oxide/rubber via ionic flocculation (a flocculant is added into the mixture emulsion to induce flocculation; and the obtained floc of graphene oxide/rubber is dried to obtain the masterbatch of graphene oxide containing the rubber substrate) or spray drying (the mixture emulsion is atomized into tiny drops by passing through a spray dryer, and the tiny drops are then dehydrated in a drying medium to obtain the masterbatch of graphene oxide containing the rubber substrate; and in some cases, gasified flocculant can be added into the carrier gas that functions as the drying medium so as to carry out ionic flocculation and dehydration simultaneously).

The masterbatch of white carbon black is prepared via the emulsion method as described bellow: white carbon black and a coupling agent, or white carbon black modified with a coupling agent, is dispersed in deionized water to obtain a pulp of white carbon black; the pulp of white carbon black is then mixed with a rubber latex to obtain a liquid mixture of white carbon black/rubber; and the masterbatch of white carbon black is prepared from the liquid mixture of white carbon black/rubber via ionic flocculation (a flocculant is added into the mixture emulsion to induce flocculation; and the obtained floc of white carbon black/rubber is dried to obtain the masterbatch of white carbon black containing the rubber substrate) or spray drying (the liquid mixture is atomized into tiny drops by passing through a spray dryer, and the tiny drops are then dehydrated in a drying medium to obtain the masterbatch of white carbon black containing the rubber substrate; and in some cases, gasified flocculant can be added into the carrier gas that works as the drying medium so as to carry out ionic flocculation and dehydration simultaneously).

The white carbon black modified with a surfactant is prepared via the following method: water is mixed with an organic solvent and the pH of the mixture is adjusted to be lower than 6 or higher than 8 by adding acid or base; a coupling agent is added into the mixture to achieve a molar ratio of the coupling agent to the water of from 1:0.1 to 1:10000. The mixture is let stand for 0.5-48 h until the mixture turn to a clear, transparent hydrosol; white carbon black is added into the hydrosol and then ultrasonicated or mixed by a high-shear mixer at a temperature of lower than 50° C.; the ultrasonicated or mixed mixture is stirred and undergoes volatilization at room temperature until the weight of the mixture decreases to 0.1-50% of the original weight thereof; after that, the mixture is stirred and heated at 50-80° C. for 0.5-120 h and then heated at 81-260° C. for 0.5-480 h, then dried and grinded to obtain white carbon black modified with the coupling agent.

The methods of this invention for preparing graphene oxide/white carbon black/rubber nanocomposite material are carried out as follows:

1) Solution Mixing Method:

Graphite oxide is dispersed and ultrasonicated in deionized water at 0.1-1000 kw for 10 min-6 h to obtain a hydrosol of graphene oxide containing 0.01-20 wt % of graphene oxide. White carbon black and a coupling agent, or white carbon black modified with a coupling agent, are added into the hydrosol of graphene oxide and then ultrasonicated at 0.1-1000 kw for 10 min-6 h or stirred at 50-10000 r/min for 30 min-12 h to obtain a hydrosol of graphene oxide/white carbon black. Next, a surfactant is added into the hydrosol of graphene oxide/white carbon black and ultrasonicated at 0.1-1000 kw for 10 min-6 h or stirred at 50-10000 r/min for 30 min-12 h to obtain a pre-treated hydrosol of graphene oxide/white carbon black.

The hydrosol of graphene oxide/white carbon black, or the pre-treated hydrosol of graphene oxide/white carbon black, is ultrasonicated with rubber latex at 0.1-1000 kw for 10 min-6 h or stirred at 50-10000 r/min for 30 min-12 h to obtain a stable mixture emulsion. The temperature during the ultrasonication needs to be controlled. When the temperature exceeds 80° C., ultrasonication is stopped and the mixture is stirred at 50-500 r/min for 5-30 min until the temperature decreases. After that, ultrasonication is resumed. The temperature during the whole preparation process shall be less than 100° C. to avoid self-polymerization of the coupling agent or surfactant.

Next, one of the following two approaches is carried out:

A) ionic flocculation: a flocculant is added into the mixture emulsion and stirred at 50-10000 r/min to induce demulsification and flocculation. The obtained floc of graphene oxide/white carbon black/rubber is dried at 60-300° C. to remove water therefrom to obtain the graphene oxide/white carbon black/rubber nanocomposite material; and B) spray drying: the mixture emulsion is atomized into tiny drops by passing through a spray dryer. The tiny drops are then dehydrated in a drying medium to obtain the graphene oxide/white carbon black/rubber nanocomposite material. In another method, gasified flocculant is added into the carrier gas that works as the drying medium so as to carry out ionic flocculation and dehydration simultaneously, which achieves a rapider transformation from the drops of graphene oxide/white carbon black/rubber to solid, inhibits the thermodynamic trend of aggregation of graphene oxide and white carbon black, and retains the phase structure of the mixture emulsion of graphene oxide/white carbon black/rubber in the dried solid particles. The temperature at the inlet of the spray dryer is 100-350° C., and the temperature at the outlet of the spray dryer is 70-120° C. The drying medium is heated air. When introducing gasified flocculant into the carrier gas, the percent of the gasified flocculant's flow with respect to that of the carrier gas is 1%.

2) Mechanical Blending Method:

Mechanical blending include four different approaches:

1. The masterbatch of graphene oxide prepared from emulsion method is masticated in a two roll mixing mill or an internal mixer for 1-5 min. White carbon black and a surfactant, or white carbon black modified with a surfactant, are then added into and mixed with the masterbatch for 1-20 min to obtain the graphene oxide/white carbon black/rubber nanocomposite material;

2. The masterbatch of white carbon black prepared from emulsion method is masticated in a two roll mixing mill or an internal mixer for 1-5 min. Graphene oxide and a surfactant are then added into and mixed with the masterbatch for 1-20 min to obtain the graphene oxide/white carbon black/rubber nanocomposite material;

3. Dry rubber is masticated in a two roll mixing mill or an internal mixer for 1-5 min. White carbon black modified with a coupling agent, graphene oxide, and a surfactant (or white carbon black, a coupling agent, graphene oxide, and a surfactant) are then added into and mixed with the dry rubber for 1-20 min to obtain the graphene oxide/white carbon black/rubber nanocomposite material; and 4. The masterbatch of graphene oxide and the masterbatch of white carbon black prepared from emulsion method are masticated in a two roll mixing mill or an internal mixer for 1-20 min to obtain the graphene oxide/white carbon black/rubber nanocomposite material.

In the graphene oxide/white carbon black/rubber nanocomposite material, the white carbon black includes those prepared by precipitation method or vapor deposition method. The ratio of the weights of white carbon black and graphene oxide to that of the rubber is 0.1-400 phr (phr is a unit defined as 1 weight part of white carbon black and graphene oxide with respect to 100 weight parts of the rubber). The graphene oxide partially replaces the white carbon black and has a weight ratio of 0.05-20 phr (phr is defined as 1 weight part of graphene oxide with respect to 100 weight parts of the rubber).

The rubber latex in solution mixing method 1) is styrene-butadiene rubber latex, natural rubber latex, chloroprene rubber latex, butyl rubber latex, nitrile rubber latex, polybutadiene latex, ethylene propylene rubber latex, polyisoprene latex, fluoroelastomer latex, silicone latex, or a mixture thereof. These latexes have a solid content of 10-80 wt %. The rubber substrate of the masterbatches in approaches 1, 2, and 4 of mechanical blending method 2) and the rubber in approach 3 of mechanical blending method 2) is styrene-butadiene rubber, natural rubber, chloroprene rubber, butyl rubber, nitrile rubber, polybutadiene, ethylene propylene rubber, polyisoprene, fluoroelastomer, silicone, or a mixture thereof.

The surfactant is carboxylated polybutadiene, (3-aminopropyl)triethoxysilane, [γ-(methacryloxy)propyl]trimethoxysilane, quaternary ammonium salt, or carboxylated styrene-butadiene rubber latex, butadiene-vinyl pyridine rubber latex, carboxylated styrene-butadiene-vinyl pyridine rubber latex, epoxy natural rubber latex, carboxylated chloroprene rubber latex, and carboxylated nitrile rubber latex that have solid contents of 10-80 wt %. The content of the surfactant is 0-100 phr (phr is a unit defined as 1 weight part of the surfactant with respect to 100 weight parts of the rubber).

The flocculant is nitric acid, sulfuric acid, hydrochloric acid, hydrobromic acid, hydrofluoric acid, calcium chloride, sodium chloride, potassium chloride, sodium sulfate, aluminum sulfate, ferric chloride, or aluminum chlorohydrate. The flocculant able to be introduced into the carrier gas is one that is able to be gasified at a temperature lower than 350° C., which is nitric acid, hydrobromic acid, hydrofluoric acid, hydrochloric acid, or sulfuric acid.

The coupling agent is selected from bis[γ-(triethoxysilyl)propyl]tetrasulfide (Si-69), bis[γ-(triethoxysilyl)propyl]disulfide (Si-75), (γ-aminopropyl)triethoxysilane (KH-550), (γ-glycidyloxypropyl)trimethoxysilane (KH-560), [γ-(methacryloyloxy)propyl]trimethoxysilane (KH-570), (γ-mercaptopropyl)trimethoxysilane (KH-590), stearic acid, and silazane. The percent of weight of the coupling agent with respect to that of the white carbon black is 0.01-50%.

One of the advantages of this invention is that the solution mixing method and mechanical blending method are both feasible to prepare graphene oxide/white carbon black/rubber nanocomposite material. In this invention, ionic flocculation or spray drying retains the phase structure of the mixture emulsion of graphene oxide/white carbon black/rubber so as to obtain graphene oxide/white carbon black/rubber nanocomposite material that is highly dispersed in nanoscale and completely peeled off. Furthermore, the phase structures of graphene oxide/rubber and white carbon black/rubber liquid mixtures are preserved in the pre-prepared masterbatches of graphene oxide and white carbon black, respectively. Accordingly, by mixing the two matchbatches with a filler or by mixing the two matchbatches with each other, graphene oxide/white carbon black/rubber nanocomposite material that is highly dispersed in nanoscale and completely peeled off can be prepared.

Moreover, the methods of this invention are simple, low cost, environmentally friendly, and feasible for large-scale production.

DETAILED DESCRIPTION OF THE EMBODIMENTS

The methods for preparing graphene oxide/white carbon black/rubber nanocomposite materials described below include controlling the temperatures of the relevant solutions to be less than 100° C., and the gas added into the carrier gas are measured in volume percent with respect to the carrier gas.

Example 1

1 g of graphene oxide is dispersed in 10 kg of deionized water and ultrasonicated at 0.1 kw for 10 min to obtain a hydrosol of graphene oxide having a solid content of 0.01%. 1 g of white carbon black prepared by precipitation method and 0.01 g of bis[γ-(triethoxysilyl)propyl]tetrasulfide are added into the hydrosol and stirred at 50 r/min for 30 min to obtain a hydrosol of graphene oxide/white carbon black. The hydrosol of graphene oxide/white carbon black is mixed with 20 kg of styrene-butadiene rubber latex having a solid content of 10% and stirred at 50 r/min for 12 h to obtain a stable mixture emulsion of graphene oxide/white carbon black/styrene-butadiene rubber. This mixture emulsion is mixed with a solution of 1% calcium chloride solution to carry out flocculation and stirred at 50 r/min until no more floc appears. The floc of graphene oxide/white carbon black/styrene-butadiene rubber is washed by water and then dried in an oven at 60° C. The dried product is the graphene oxide/white carbon black/styrene-butadiene rubber nanocomposite material containing 0.1 phr of the fillers.

100.1 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/styrene-butadiene rubber nanocomposite material. This nanocomposite material is tested according to the national standards.

Example 2

20 g of graphene oxide is dispersed in 100 g of deionized water and ultrasonicated at 1000 kw for 6 h to obtain a hydrosol of graphene oxide having a solid content of 20%. If the temperature during ultrasonication exceeds 80° C., ultrasonication is stopped and the mixture is stirred at 500 r/min for 30 min so that the temperature decreases to allow resuming ultrasonication. 380 g of white carbon black prepared by precipitation method and 190 g of bis[γ-(triethoxysilyl)propyl]disulfide are added into the hydrosol and ultrasonicated at 1000 kw for 6 h to obtain a hydrosol of graphene oxide/white carbon black. If the temperature during ultrasonication exceeds 80° C., ultrasonication is stopped and the mixture is stirred at 500 r/min for 30 min so that the temperature decreases to allow resuming ultrasonication. 125 g of carboxylated styrene-butadiene rubber latex containing 80 wt % of a surfactant is mixed with the hydrosol of graphene oxide/white carbon black and ultrasonicated at 1000 kw for 6 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of styrene-butadiene rubber latex having a solid content of 80% and ultrasonicated at 1000 kw for 6 h to obtain a stable mixture emulsion of graphene oxide/white carbon black/styrene-butadiene rubber. If the temperature during ultrasonication exceeds 80° C., ultrasonication is stopped and the mixture is stirred at 500 r/min for 30 min so that the temperature decreases to allow resuming ultrasonication. This mixture emulsion is mixed with a solution of 1% hydrogen chloride solution to carry out flocculation and stirred at 10000 r/min until no more floc appears. The floc of graphene oxide/white carbon black/styrene-butadiene rubber is washed by water and then dried in an oven at 300° C. The dried product is the graphene oxide/white carbon black/styrene-butadiene rubber nanocomposite material containing 400 phr of the fillers.

590 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized graphene oxide/white carbon black/rubber nanocomposite material. This nanocomposite material is tested according to the national standards.

Example 3

5 g of graphene oxide is dispersed in 500 g of deionized water and ultrasonicated at 300 kw for 2 h to obtain a hydrosol of graphene oxide having a solid content of 1%. If the temperature during ultrasonication exceeds 80° C., ultrasonication is stopped and the mixture is stirred at 300 r/min for 15 min so that the temperature decreases to allow resuming ultrasonication. 70 g of white carbon black prepared by precipitation method and 5.6 g of bis[γ-(triethoxysilyl)propyl]tetrasulfide are added into the hydrosol and ultrasonicated at 300 kw for 2 h to obtain a hydrosol of graphene oxide/white carbon black. If the temperature during ultrasonication exceeds 80° C., ultrasonication is stopped and the mixture is stirred at 500 r/min for 30 min so that the temperature decreases to allow resuming ultrasonication. 200 g of carboxylated styrene-butadiene-vinyl pyridine rubber latex containing 10 wt % of a surfactant is mixed with the hydrosol of graphene oxide/white carbon black and ultrasonicated at 300 kw for 3 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of styrene-butadiene rubber latex having a solid content of 80% and ultrasonicated at 500 kw for 4 h to obtain a stable mixture emulsion of graphene oxide/white carbon black/styrene-butadiene rubber. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 150° C. as the drying medium. The inlet temperature is 150° C., and the outlet temperature is 80° C. The carrier gas further contains 1 vol % of gaseous hydrogen chloride. The dried product is the graphene oxide/white carbon black/styrene-butadiene rubber nanocomposite material containing 75 phr of the fillers.

200.6 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized graphene oxide/white carbon black/rubber nanocomposite material. This nanocomposite material is tested according to the national standards.

Example 4

5 g of graphene oxide is dispersed in 500 g of deionized water and ultrasonicated at 300 kw for 2 h to obtain a hydrosol of graphene oxide having a solid content of 1%. If the temperature during ultrasonication exceeds 80° C., ultrasonication is stopped and the mixture is stirred at 300 r/min for 15 min so that the temperature decreases to allow resuming ultrasonication. 50 g of white carbon black prepared by precipitation method and 4 g of (γ-mercaptopropyl)trimethoxysilane are added into the hydrosol and ultrasonicated at 100 kw for 2 h to obtain a hydrosol of graphene oxide/white carbon black. If the temperature during ultrasonication exceeds 80° C., ultrasonication is stopped and the mixture is stirred at 300 r/min for 30 min so that the temperature decreases to allow resuming ultrasonication. 100 g of epoxy natural rubber latex containing 10 wt % of a surfactant is mixed with the hydrosol of graphene oxide/white carbon black and ultrasonicated at 100 kw for 3 h to obtain a hydrosol of graphene oxide/white carbon black pre-treated by the surfactant. If the temperature during ultrasonication exceeds 80° C., ultrasonication is stopped and the mixture is stirred at 300 r/min for 10 min so that the temperature decreases to allow resuming ultrasonication. This hydrosol of graphene oxide/white carbon black pre-treated by the surfactant is mixed with 200 g of natural rubber latex having a solid content of 50% and stirred at 10000 r/min for 30 min to obtain a stable mixture emulsion of graphene oxide/white carbon black/natural rubber. This mixture emulsion is passed through a spray dryer with a heated air at 100° C. as the drying medium. The inlet temperature is 100° C., and the outlet temperature is 70° C. The carrier gas further contains 1 vol % of gaseous hydrogen sulfate. The dried product is the graphene oxide/white carbon black/natural rubber nanocomposite material containing 55 phr of the fillers.

169 g of the nanocomposite material is mixed with 5 weight parts of zinc oxide, 2 weight parts of stearic acid, 3 weight parts of accelerator DM, 2 weight parts of antiager 4010NA, 2 weight parts of antiager RD, and 2 weight parts of sulfur in a two roll mixing mill to obtain a rubber mix. The rubber mix is vulcanized at 143° C. for an optimized curing time to obtain a vulcanized graphene oxide/white carbon black/rubber nanocomposite material. This nanocomposite material is tested according to the national standards.

Example 5

10 g of graphene oxide is dispersed in 1 kg of deionized water and ultrasonicated at 500 kw for 2 h to obtain a hydrosol of graphene oxide having a solid content of 1%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of (γ-aminopropyl) triethoxysilane is added into the hydrosol and stirred at 3000 r/min for 6 h to obtain a hydrosol of graphene oxide/white carbon black. 125 g of natural rubber latex having a solid content of 80% is mixed with the hydrosol of graphene oxide/white carbon black and ultrasonicated at 300 kw for 3 h to a stable mixture emulsion of graphene oxide/white carbon black/natural rubber. If the temperature during ultrasonication exceeds 80° C., ultrasonication is stopped and the mixture is stirred at 100 r/min for 20 min so that the temperature decreases to allow resuming ultrasonication. This mixture emulsion is passed through a spray dryer with a heated air at 100° C. as the drying medium. The inlet temperature is 100° C., and the outlet temperature is 70° C. The dried product is the graphene oxide/white carbon black/natural rubber nanocomposite material containing 60 phr of the fillers.

164 g of the nanocomposite material is mixed with 5 weight parts of zinc oxide, 2 weight parts of stearic acid, 3 weight parts of accelerator DM, 2 weight parts of antiager 4010NA, 2 weight parts of antiager RD, and 2 weight parts of sulfur in a two roll mixing mill to obtain a rubber mix. The rubber mix is vulcanized at 143° C. for an optimized curing time to obtain a vulcanized graphene oxide/white carbon black/rubber nanocomposite material. This nanocomposite material is tested according to the national standards.

Example 6

5 g of graphene oxide is dispersed in 500 g of deionized water and ultrasonicated at 300 kw for 2 h to obtain a hydrosol of graphene oxide having a solid content of 1%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of bis[γ-(triethoxysilyl)propyl]tetrasulfide is added into the hydrosol and stirred at 3000 r/min for 6 h to obtain a hydrosol of graphene oxide/white carbon black. 200 g of butadiene-vinyl pyridine rubber latex containing 10 wt % of a surfactant is mixed with the hydrosol of graphene oxide/white carbon black and ultrasonicated at 100 kw for 3 h to obtain a hydrosol of graphene oxide/white carbon black pre-treated by the surfactant. If the temperature during ultrasonication exceeds 80° C., ultrasonication is stopped and the mixture is stirred at 300 r/min for 10 min so that the temperature decreases to allow resuming ultrasonication. This hydrosol of graphene oxide/white carbon black pre-treated by the surfactant is mixed with 62.5 g of natural rubber latex having a solid content of 80% and 62.5 g of styrene-butadiene rubber latex having a solid content of 80% and ultrasonicated at 300 kw for 3 h to obtain a stable mixture emulsion of graphene oxide/white carbon black/styrene-butadiene rubber/natural rubber. If the temperature during ultrasonication exceeds 80° C., ultrasonication is stopped and the mixture is stirred at 300 r/min for 30 min so that the temperature decreases to allow resuming ultrasonication. This mixture emulsion is passed through a spray dryer with a heated air at 100° C. as the drying medium. The inlet temperature is 100° C., and the outlet temperature is 70° C. The dried product is the graphene oxide/white carbon black/styrene-butadiene rubber/natural rubber nanocomposite material containing 55 phr of the fillers.

179 g of the nanocomposite material is mixed with 5 weight parts of zinc oxide, 2 weight parts of stearic acid, 3 weight parts of accelerator DM, 2 weight parts of antiager 4010NA, 2 weight parts of antiager RD, and 2 weight parts of sulfur in a two roll mixing mill to obtain a rubber mix. The rubber mix is vulcanized at 143° C. for an optimized curing time to obtain a vulcanized graphene oxide/white carbon black/rubber nanocomposite material. This nanocomposite material is tested according to the national standards.

Example 7

8 g of graphene oxide is dispersed in 500 g of deionized water and ultrasonicated at 500 kw for 3 h to obtain a hydrosol of graphene oxide having a solid content of 1.6%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of (γ-glycidyloxypropyl)trimethoxysilane is added into the hydrosol and stirred at 3000 r/min for 6 h to obtain a hydrosol of graphene oxide/white carbon black. 20 g of the surfactant of carboxylated polybutadiene is mixed with the hydrosol of graphene oxide/white carbon black and then ultrasonicated at 600 kw for 3 h to obtain a hydrosol of graphene oxide/white carbon black pre-treated by the surfactant. If the temperature during ultrasonication exceeds 80° C., ultrasonication is stopped and the mixture is stirred at 500 r/min for 20 min so that the temperature decreases to allow resuming ultrasonication. This hydrosol of graphene oxide/white carbon black pre-treated by the surfactant is mixed with 200 g of polybutadiene latex having a solid content of 50% and stirred at 8000 r/min for 8 h to obtain a stable mixture emulsion of graphene oxide/white carbon black/polybutadiene. This mixture emulsion is passed through a spray dryer with a heated air at 150° C. as the drying medium. The inlet temperature is 150° C., and the outlet temperature is 80° C. The carrier gas further contains 1 vol % of gaseous hydrogen chloride. The dried product is the graphene oxide/white carbon black/polybutadiene nanocomposite material containing 58 phr of the fillers.

182 g of the nanocomposite material is mixed with 5 weight parts of zinc oxide, 3 weight parts of stearic acid, 2 weight parts of accelerator CZ, 10 weight parts of di-n-octyl phthalate, 0.2 weight part of accelerator TT, 1 weight part of antiager 4010NA, 1 weight part of antiager D, and 4 weight parts of sulfur in a two roll mixing mill to obtain a rubber mix. The rubber mix is vulcanized at 150° C. for an optimized curing time to obtain a vulcanized graphene oxide/white carbon black/rubber nanocomposite material. This nanocomposite material is tested according to the national standards.

Example 8

5 g of graphene oxide is dispersed in 500 g of deionized water and ultrasonicated at 300 kw for 2 h to obtain a hydrosol of graphene oxide having a solid content of 1%. If the temperature during ultrasonication exceeds 80° C., ultrasonication is stopped and the mixture is stirred at 300 r/min for 15 min so that the temperature decreases to allow resuming ultrasonication. 75.6 g of white carbon black prepared by precipitation method and modified with 5.6 g of [γ-(methacryloyloxy)propyl]trimethoxysilane is added into the hydrosol and ultrasonicated at 300 kw for 3 h to obtain a hydrosol of graphene oxide/white carbon black. If the temperature during ultrasonication exceeds 80° C., ultrasonication is stopped and the mixture is stirred at 500 r/min for 30 min so that the temperature decreases to allow resuming ultrasonication. 20 g of the surfactant of [γ-(methacryloyloxy)propyl] trimethoxysilane is mixed with the hydrosol of graphene oxide/white carbon black and then ultrasonicated at 800 kw for 6 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of styrene-butadiene rubber latex/natural rubber latex/polybutadiene latex having a solid content of 80% and ultrasonicated at 500 kw for 4 h to obtain a stable mixture emulsion of graphene oxide/white carbon black/styrene-butadiene rubber/natural rubber/polybutadiene. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 150° C. as the drying medium. The inlet temperature is 150° C., and the outlet temperature is 80° C. The carrier gas further contains 1 vol % of gaseous hydrogen chloride. The dried product is the graphene oxide/white carbon black/styrene-butadiene rubber/natural rubber/polybutadiene nanocomposite material containing 75 phr of the fillers.

200.6 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 9

2 g of graphene oxide is dispersed in 500 g of deionized water and ultrasonicated at 300 kw for 1 h to obtain a hydrosol of graphene oxide having a solid content of 0.4%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of [γ-(methacryloyloxy)propyl]trimethoxysilane is added into the hydrosol and stirred at 3000 r/min for 6 h to obtain a hydrosol of graphene oxide/white carbon black. 20 g of carboxylated chloroprene rubber latex with a surfactant content of 50 wt % is mixed with the hydrosol of graphene oxide/white carbon black and stirred at 5000 r/min for 6 h to obtain a hydrosol of graphene oxide/white carbon black pre-treated by the surfactant. This hydrosol of graphene oxide/white carbon black pre-treated by the surfactant is mixed with 200 g of chloroprene rubber latex having a solid content of 50% and stirred at 8000 r/min for 8 h to obtain a stable mixture emulsion of graphene oxide/white carbon black/chloroprene rubber. This mixture emulsion is passed through a spray dryer with a heated air at 200° C. as the drying medium. The inlet temperature is 200° C., and the outlet temperature is 100° C. The carrier gas further contains 1 vol % of gaseous hydrogen nitrate. The dried product is the graphene oxide/white carbon black/chloroprene rubber nanocomposite material containing 52 phr of the fillers.

166 g of the nanocomposite material is mixed with 5 weight parts of zinc oxide, 0.5 weight part of stearic acid, 4 weight parts of magnesium oxide, 0.5 weight part of accelerator NA-22, 10 weight parts of naphthenic acid, 2 weight parts of antiager 4010NA, and 2 weight parts of antiager TPPD in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 10

5 g of graphene oxide is dispersed in 500 g of deionized water and ultrasonicated at 300 kw for 1 h to obtain a hydrosol of graphene oxide having a solid content of 1%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of [γ-(methacryloyloxy)propyl]trimethoxysilane is added into the hydrosol and stirred at 3000 r/min for 6 h to obtain a hydrosol of graphene oxide/white carbon black. 20 g of the surfactant of [γ-(methacryloyloxy)propyl]trimethoxysilane is added into the hydrosol and ultrasonicated at 300 kw for 1 h to obtain a hydrosol of graphene oxide/white carbon black pre-treated by the surfactant. If the temperature during ultrasonication exceeds 80° C., ultrasonication is stopped and the mixture is stirred at 300 r/min for 30 min so that the temperature decreases to allow resuming ultrasonication. This hydrosol of graphene oxide/white carbon black pre-treated by the surfactant is mixed with 125 g of butyl rubber latex having a solid content of 80% and ultrasonicated at 800 kw for 6 h to obtain a stable mixture emulsion of graphene oxide/white carbon black/butyl rubber. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 200° C. as the drying medium. The inlet temperature is 200° C., and the outlet temperature is 100° C. The carrier gas further contains 1 vol % of gaseous hydrogen nitrate. The dried product is the graphene oxide/white carbon black/butyl rubber nanocomposite material containing 55 phr of the fillers.

179 g of the nanocomposite material is mixed with 5 weight parts of zinc oxide, 2 weight parts of stearic acid, 2 weight parts of paraffin wax, 2 weight parts of accelerator CZ, 0.2 weight part of accelerator TT, 10 weight parts of aromatic hydrocarbon oil, 1 weight part of antiager 4010NA, 1 weight part of antiager RD, and 2 weight parts of sulfur in a two roll mixing mill to obtain a rubber mix. The rubber mix is vulcanized at 170° C. for an optimized curing time to obtain a vulcanized white carbon black/rubber nanocomposite material. This nanocomposite material is tested according to the national standards.

Example 11

10 g of graphene oxide is dispersed in 500 g of deionized water and ultrasonicated at 300 kw for 6 h to obtain a hydrosol of graphene oxide having a solid content of 2%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of bis[γ-(triethoxysilyl)propyl]tetrasulfide is added into the hydrosol and stirred at 3000 r/min for 6 h to obtain a hydrosol of graphene oxide/white carbon black. 62.5 g of butadiene-vinyl pyridine rubber latex containing 80 wt % of a surfactant is mixed with the hydrosol of graphene oxide/white carbon black and ultrasonicated at 1000 kw for 4 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 200 g of ethylene propylene rubber latex having a solid content of 50% and stirred at 5000 r/min for 12 h to obtain a stable mixture emulsion of graphene oxide/white carbon black/ethylene propylene rubber. This mixture emulsion is passed through a spray dryer with a heated air at 350° C. as the drying medium. The inlet temperature is 350° C., and the outlet temperature is 120° C. The carrier gas further contains 1 vol % of gaseous hydrogen nitrate. The dried product is the graphene oxide/white carbon black/ethylene propylene rubber nanocomposite material containing 60 phr of the fillers.

214 g of the nanocomposite material is mixed with 5 weight parts of zinc oxide, 2 weight parts of stearic acid, 1 weight part of protective wax, 30 weight parts of liquid paraffin, 2 weight parts of A151, 0.2 weight part of accelerator TT, 2 weight parts of accelerator CZ, and 6 weight parts of sulfur in a two roll mixing mill to obtain a rubber mix. The rubber mix is vulcanized at 170° C. for an optimized curing time to obtain a vulcanized white carbon black/rubber nanocomposite material. This nanocomposite material is tested according to the national standards.

Example 12

10 g of graphene oxide is dispersed in 500 g of deionized water and ultrasonicated at 400 kw for 3 h to obtain a hydrosol of graphene oxide having a solid content of 2%. If the temperature during ultrasonication exceeds 80° C., ultrasonication is stopped and the mixture is stirred at 300 r/min for 30 min so that the temperature decreases to allow resuming ultrasonication. 54 g of white carbon black prepared by precipitation method and modified with 4 g of bis[γ-(triethoxysilyl)propyl]tetrasulfide is added into the hydrosol and stirred at 3000 r/min for 6 h to obtain a hydrosol of graphene oxide/white carbon black. 20 g of the surfactant of quaternary ammonium salt is added into the hydrosol and ultrasonicated at 1000 kw for 4 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of polyisoprene latex having a solid content of 80% and ultrasonicated at 800 kw for 6 h to obtain a stable mixture emulsion of graphene oxide/white carbon black/polyisoprene. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 150° C. as the drying medium. The inlet temperature is 150° C., and the outlet temperature is 80° C. The carrier gas further contains 1 vol % of gaseous hydrogen chloride. The dried product is the graphene oxide/white carbon black/polyisoprene nanocomposite material containing 60 phr of the fillers.

184 g of the nanocomposite material is mixed with 5 weight parts of zinc oxide, 2 weight parts of stearic acid, 3 weight parts of accelerator DM, 2 weight parts of antiager 4010NA, 2 weight parts of antiager RD, and 2 weight parts of sulfur in a two roll mixing mill to obtain a rubber mix. The rubber mix is vulcanized at 143° C. for an optimized curing time to obtain a vulcanized white carbon black/rubber nanocomposite material. This nanocomposite material is tested according to the national standards.

Example 13

10 g of graphene oxide is dispersed in 500 g of deionized water and ultrasonicated at 400 kw for 3 h to obtain a hydrosol of graphene oxide having a solid content of 2%. If the temperature during ultrasonication exceeds 80° C., ultrasonication is stopped and the mixture is stirred at 300 r/min for 30 min so that the temperature decreases to allow resuming ultrasonication. 77 g of white carbon black prepared by vapor deposition method and modified with 7 g of stearic acid is added into the hydrosol and ultrasonicated at 500 kw for 2 h to obtain a hydrosol of graphene oxide/white carbon black. If the temperature during ultrasonication exceeds 80° C., ultrasonication is stopped and the mixture is stirred at 300 r/min for 15 min so that the temperature decreases to allow resuming ultrasonication. 40 g of carboxylated nitrile rubber latex containing 50 wt % of a surfactant is mixed with the hydrosol of graphene oxide/white carbon black and ultrasonicated at 600 kw for 4 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of nitrile rubber latex having a solid content of 80% and ultrasonicated at 800 kw for 6 h to obtain a stable mixture emulsion of graphene oxide/white carbon black/nitrile rubber. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 350° C. as the drying medium. The inlet temperature is 350° C., and the outlet temperature is 120° C. The carrier gas further contains 1 vol % of gaseous hydrogen chloride. The dried product is the graphene oxide/white carbon black/nitrile rubber nanocomposite material containing 80 phr of the fillers.

207 g of the nanocomposite material is mixed with 3 weight parts of zinc oxide, 2 weight parts of stearic acid, 1 weight part of accelerator D, 2 weight parts of accelerator DM, 30 weight parts of di-n-octyl phthalate, 2 weight parts of protective wax, 2 weight parts of antiager 4010NA, 2 weight parts of antiager RD, and 4 weight parts of sulfur in a two roll mixing mill to obtain a rubber mix. The rubber mix is vulcanized at 170° C. for an optimized curing time to obtain a vulcanized white carbon black/rubber nanocomposite material. This nanocomposite material is tested according to the national standards.

Example 14

10 g of graphene oxide is dispersed in 500 g of deionized water and ultrasonicated at 400 kw for 3 h to obtain a hydrosol of graphene oxide having a solid content of 2%. If the temperature during ultrasonication exceeds 80° C., ultrasonication is stopped and the mixture is stirred at 300 r/min for 30 min so that the temperature decreases to allow resuming ultrasonication. 77 g of white carbon black prepared by vapor deposition method and modified with 7 g of stearic acid is added into the hydrosol and ultrasonicated at 500 kw for 2 h to obtain a hydrosol of graphene oxide/white carbon black. If the temperature during ultrasonication exceeds 80° C., ultrasonication is stopped and the mixture is stirred at 300 r/min for 15 min so that the temperature decreases to allow resuming ultrasonication. 10 g of the surfactant of quaternary ammonium salt is added into the hydrosol and ultrasonicated at 600 kw for 4 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 125 g of fluoroelastomer latex having a solid content of 80% and ultrasonicated at 1000 kw for 6 h to obtain a stable mixture emulsion of graphene oxide/white carbon black/fluoroelastomer. If the temperature during ultrasonication exceeds 80° C., ultrasonication is stopped and the mixture is stirred at 500 r/min for 30 min so that the temperature decreases to allow resuming ultrasonication. This mixture emulsion is passed through a spray dryer with a heated air at 150° C. as the drying medium. The inlet temperature is 150° C., and the outlet temperature is 120° C. The carrier gas further contains 1 vol % of gaseous hydrogen fluoride. The dried product is the graphene oxide/white carbon black/fluoroelastomer nanocomposite material containing 80 phr of the fillers.

197 g of the nanocomposite material is mixed with 1 weight part of stearic acid, 5 weight parts of TAIC, and 1 weight part of bis(tert-butyldioxyisopropyl)benzene in a two roll mixing mill to obtain a rubber mix. The rubber mix is first vulcanized at 170° C. and then vulcanized at 230° C. for an optimized curing time to obtain a vulcanized white carbon black/rubber nanocomposite material. This nanocomposite material is tested according to the national standards.

Example 15

20 g of graphene oxide is dispersed in 1000 g of deionized water and ultrasonicated at 300 kw for 4 h to obtain a hydrosol of graphene oxide having a solid content of 2%. If the temperature during ultrasonication exceeds 80° C., ultrasonication is stopped and the mixture is stirred at 300 r/min for 20 min so that the temperature decreases to allow resuming ultrasonication. 88 g of white carbon black prepared by vapor deposition method and modified with 8 g of silazane is added into the hydrosol and ultrasonicated at 500 kw for 2 h to obtain a hydrosol of graphene oxide/white carbon black. If the temperature during ultrasonication exceeds 80° C., ultrasonication is stopped and the mixture is stirred at 300 r/min for 15 min so that the temperature decreases to allow resuming ultrasonication. 40 g of the surfactant of (3-aminopropyl) triethoxysilane is added into the hydrosol and ultrasonicated at 600 kw for 4 h to obtain a hydrosol of graphene oxide/white carbon black pre-treated by the surfactant. If the temperature during ultrasonication exceeds 80° C., ultrasonication is stopped and the mixture is stirred at 500 r/min for 30 min so that the temperature decreases to allow resuming ultrasonication. This hydrosol of graphene oxide/white carbon black pre-treated by the surfactant is mixed with 200 g of silicone latex having a solid content of 50% and ultrasonicated at 500 kw for 4 h to obtain a stable mixture emulsion of graphene oxide/white carbon black/silicone. If the temperature during ultrasonication exceeds 80° C., ultrasonication is stopped and the mixture is stirred at 300 r/min for 30 min so that the temperature decreases to allow resuming ultrasonication. This mixture emulsion is passed through a spray dryer with a heated air at 200° C. as the drying medium. The inlet temperature is 200° C., and the outlet temperature is 100° C. The dried product is the graphene oxide/white carbon black/silicone nanocomposite material containing 100 phr of the fillers.

248 g of the nanocomposite material is mixed with 1.5 weight parts of DCP in a two roll mixing mill to obtain a rubber mix. The rubber mix is vulcanized at 160° C. for an optimized curing time to obtain a vulcanized white carbon black/rubber nanocomposite material. This nanocomposite material is tested according to the national standards.

Example 16

105 g of the masterbatch of graphene oxide prepared by emulsion method and containing 100 g of the substrate of natural rubber and 5 g of graphene oxide is masticated in a two roll mixing mill for 1 min. Next, 58 g of white carbon black prepared by precipitation method and modified with 8 g of bis[γ-(triethoxysilyl)propyl]tetrasulfide is added into and mixed with the masterbatch for 8 min to obtain the graphene oxide/white carbon black/natural rubber nanocomposite material containing 55 phr of the fillers.

163 g of the nanocomposite material is mixed with 5 weight parts of zinc oxide, 2 weight parts of stearic acid, 3 weight parts of accelerator DM, 2 weight parts of antiager 4010NA, 2 weight parts of antiager RD, and 2 weight parts of sulfur in a two roll mixing mill to obtain a rubber mix. The rubber mix is vulcanized at 143° C. for an optimized curing time to obtain a vulcanized white carbon black/rubber nanocomposite material. This nanocomposite material is tested according to the national standards.

Example 17

125 g of the masterbatch of graphene oxide prepared by emulsion method and containing 100 g of the substrate of styrene-butadiene rubber, 5 g of graphene oxide, and 20 g of the surfactant of carboxylated styrene-butadiene rubber is masticated in an internal mixer for 5 min. Next, 75.6 g of white carbon black prepared by precipitation method and modified with 5.6 g of bis[γ-(triethoxysilyl)propyl]tetrasulfide is added into and mixed with the masterbatch for 20 min to obtain the graphene oxide/white carbon black/styrene-butadiene rubber nanocomposite material containing 75 phr of the fillers.

200.6 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 18

181 g of the masterbatch of white carbon black prepared by emulsion method and containing 100 g of the substrate of styrene-butadiene rubber, 75 g of white carbon black prepared from precipitation method, and 6 g of the coupling agent of bis[γ-(triethoxysilyl)propyl]tetrasulfide is masticated in a two roll mixing mill for 5 min. Next, 5 g of graphene oxide is added into and mixed with the masterbatch for 20 min to obtain the graphene oxide/white carbon black/styrene-butadiene rubber nanocomposite material containing 80 phr of the fillers.

186 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 19

155 g of the masterbatch of white carbon black prepared by emulsion method and containing 100 g of the substrate of styrene-butadiene rubber/natural rubber/polybutadiene, 50 g of white carbon black prepared from precipitation method, and 5 g of the coupling agent of bis[γ-(triethoxysilyl)propyl] tetrasulfide is masticated in an internal mixer for 3 min. Next, 5 g of graphene oxide and 10 g of the surfactant of carboxylated polybutadiene are added into and mixed with the masterbatch for 10 min to obtain the graphene oxide/white carbon black/styrene-butadiene rubber/natural rubber/polybutadiene nanocomposite material containing 55 phr of the fillers.

170 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 20

100 g of silicone is masticated in a two roll mixing mill for 5 min and then mixed with 5 g of graphene oxide, 10 g of the surfactant of (γ-aminopropyl)triethoxysilane, and 81 g of white carbon black prepared by vapor deposition method and modified with 6 g of silazane for 20 min to obtain the graphene oxide/white carbon black/silicone nanocomposite material containing 80 phr of the fillers.

196 g of the nanocomposite material is mixed with 1.5 weight parts of DCP in a two roll mixing mill to obtain a rubber mix. The rubber mix is vulcanized at 160° C. for an optimized curing time to obtain a vulcanized white carbon black/rubber nanocomposite material. This nanocomposite material is tested according to the national standards.

Example 21

131 g of the masterbatch of white carbon black prepared by emulsion method and containing 50 g of the substrate of styrene-butadiene rubber, 75 g of white carbon black prepared from precipitation method, and 6 g of the coupling agent of bis[γ-(triethoxysilyl)propyl]tetrasulfide is mixed with 75 g of the masterbatch of graphene oxide prepared by emulsion method and containing 50 g of the substrate of styrene-butadiene rubber, 5 g of graphene oxide, and 20 g of the surfactant of carboxylated styrene-butadiene rubber in a two roll mixing mill for 15 min to obtain the graphene oxide/white carbon black/styrene-butadiene rubber nanocomposite material containing 80 phr of the fillers.

206 g of the nanocomposite material is mixed with 5 weight parts of zinc oxide, 2 weight parts of stearic acid, 0.5 weight part of accelerator D, 0.5 weight part of accelerator DM, 0.2 weight part of accelerator TT, 1 weight part of antiager 4010NA, 1 weight part of antiager RD, and 2 weight parts of sulfur in a two roll mixing mill to obtain a rubber mix. The rubber mix is vulcanized at 150° C. for an optimized curing time to obtain a vulcanized white carbon black/rubber nanocomposite material. This nanocomposite material is tested according to the national standards.

Example 22

104 g of the masterbatch of white carbon black prepared by emulsion method and containing 50 g of the substrate of nitrile rubber, 50 g of white carbon black prepared from vapor deposition method, and 4 g of the coupling agent of stearic acid is mixed with 75 g of the masterbatch of graphene oxide prepared by emulsion method and containing 50 g of the substrate of styrene-butadiene rubber, 5 g of graphene oxide, and 20 g of the surfactant of carboxylated nitrile rubber in an internal mixer for 15 min to obtain the graphene oxide/white carbon black/nitrile rubber nanocomposite material containing 55 phr of the fillers.

179 g of the nanocomposite material is mixed with 3 weight parts of zinc oxide, 2 weight parts of stearic acid, 1 weight part of accelerator D, 2 weight parts of accelerator DM, 30 weight parts of di-n-octyl phthalate, 2 weight parts of protective wax, 2 weight parts of antiager 4010NA, 2 weight parts of antiager RD, and 4 weight parts of sulfur in a two roll mixing mill to obtain a rubber mix. The rubber mix is vulcanized at 170° C. for an optimized curing time to obtain a vulcanized white carbon black/rubber nanocomposite material. This nanocomposite material is tested according to the national standards.

Comparative Examples

A series of comparative nanocomposite materials are prepared following the preparation methods of Examples 1-22 except that the graphene oxide therein are replaced with white carbon black and surfactants are not added. The weight ratios of the coupling agents to the white carbon black in the comparative nanocomposite materials are equal to that in the corresponding examples of this invention.

The properties of the embodiments are listed below:

TABLE 1

Mechanical properties of the nanocomposite materials containing and not containing graphene oxide

| Samples | Shore A hardness | Tensile stress at a given elongation of 100% (MPa) | Tensile strength (MPa) | Elongation at break (%) | Tear strength (kN/m) | Abrasion resistance (cm$^3$/1.61 km) | Tan δ at 60° C. | Air tightness |
|---|---|---|---|---|---|---|---|---|
| Example 1 | 54 | 5.6 | 12.5 | 474 | 33.8 | 0.2213 | 0.21 | 1.9 |
| Comparative example 1 | 46 | 3.2 | 8.5 | 392 | 16.9 | 0.2814 | 0.19 | 6.5 |

TABLE 1-continued

Mechanical properties of the nanocomposite materials containing and not containing graphene oxide

| Samples | Shore A hardness | Tensile stress at a given elongation of 100% (MPa) | Tensile strength (MPa) | Elongation at break (%) | Tear strength (kN/m) | Abrasion resistance (cm$^3$/1.61 km) | Tan δ at 60° C. | Air tightness |
|---|---|---|---|---|---|---|---|---|
| Example 2 | 95 | 15.9 | 20.7 | 261 | 38.6 | 0.1887 | 0.25 | 0.9 |
| Comparative example 2 | 92 | 12.7 | 18.9 | 212 | 35.8 | 0.2019 | 0.25 | 6.2 |
| Example 3 | 82 | 7.9 | 28.2 | 643 | 52.8 | 0.1917 | 0.21 | 1.5 |
| Comparative example 3 | 77 | 6.4 | 24.2 | 482 | 43.7 | 0.2469 | 0.21 | 6.5 |
| Example 4 | 85 | 7.1 | 24.9 | 531 | 68.3 | 0.2032 | 0.17 | 1.3 |
| Comparative example 4 | 80 | 5.7 | 22.2 | 498 | 59.1 | 0.3109 | 0.16 | 4.9 |
| Example 5 | 89 | 8.4 | 26.4 | 664 | 69.9 | 0.1987 | 0.19 | 1.3 |
| Comparative example 5 | 83 | 6.9 | 23.2 | 518 | 60.1 | 0.3124 | 0.17 | 5.8 |
| Example 6 | 85 | 8.9 | 25.1 | 438 | 52.6 | 0.1874 | 0.22 | 1.4 |
| Comparative example 6 | 80 | 7.6 | 22.2 | 389 | 40.9 | 0.2217 | 0.2 | 6 |
| Example 7 | 83 | 5.5 | 21.1 | 509 | 55.9 | 0.1598 | 0.23 | 1.9 |
| Comparative example 7 | 77 | 4.2 | 20.2 | 452 | 50.1 | 0.2019 | 0.23 | 5.6 |
| Example 8 | 83 | 5.9 | 26.1 | 572 | 58.4 | 0.2234 | 0.17 | 1.5 |
| Comparative example 8 | 79 | 4.3 | 23.6 | 474 | 47.1 | 0.2587 | 0.16 | 6 |
| Example 9 | 88 | 5.3 | 20.1 | 472 | 32.4 | 0.3314 | 0.29 | 1.2 |
| Comparative example 9 | 82 | 4.1 | 18.6 | 402 | 26.9 | 0.3122 | 0.27 | 2.1 |
| Example 10 | 88 | 6.1 | 19.3 | 432 | 37.6 | 0.2183 | 0.34 | 1.2 |
| Comparative example 10 | 84 | 5.6 | 17.5 | 392 | 31.2 | 0.2417 | 0.33 | 3.1 |
| Example 11 | 88 | 5.8 | 18.5 | 423 | 46.3 | 0.3125 | 0.34 | 1.5 |
| Comparative example 11 | 81 | 4.5 | 16.2 | 392 | 35.7 | 0.3511 | 0.33 | 5.5 |
| Example 12 | 85 | 5.9 | 25.2 | 429 | 65.3 | 0.2162 | 0.18 | 1.4 |
| Comparative example 12 | 77 | 4.3 | 23.9 | 378 | 58.5 | 0.2561 | 0.16 | 5.6 |
| Example 13 | 89 | 6.9 | 23.5 | 393 | 59.7 | 0.1313 | 0.34 | 1.8 |
| Comparative example 13 | 82 | 6.3 | 21.1 | 322 | 55.1 | 0.1851 | 0.32 | 3.3 |
| Example 14 | 86 | 6.6 | 19.4 | 388 | 36.4 | 0.3164 | 0.45 | 1.6 |
| Comparative example 14 | 81 | 6 | 17.1 | 312 | 33.1 | 0.3451 | 0.42 | 4.2 |
| Example 15 | 70 | 4.3 | 14.2 | 382 | 23.4 | 0.3419 | 0.33 | 1.5 |
| Comparative example 15 | 63 | 2.4 | 11.2 | 327 | 18.9 | 0.4215 | 0.32 | 4.4 |
| Example 16 | 82 | 6.4 | 22.9 | 515 | 62.3 | 0.2532 | 0.19 | 1.8 |
| Comparative example 16 | 80 | 5.7 | 22.2 | 498 | 59.1 | 0.3109 | 0.16 | 4.9 |
| Example 17 | 80 | 7 | 26.2 | 543 | 48.8 | 0.2117 | 0.23 | 2.1 |
| Comparative example 17 | 77 | 6.4 | 24.2 | 482 | 43.7 | 0.2469 | 0.21 | 6.5 |
| Example 18 | 88 | 7.6 | 25.9 | 567 | 58.3 | 0.2232 | 0.18 | 1.3 |
| Comparative example 18 | 82 | 6.4 | 23.2 | 513 | 53.1 | 0.3469 | 0.14 | 5 |
| Example 19 | 80 | 4.8 | 20.7 | 479 | 53.9 | 0.1838 | 0.25 | 2.1 |
| Comparative example 19 | 77 | 4.2 | 20.2 | 452 | 50.1 | 0.2019 | 0.23 | 5.6 |
| Example 20 | 67 | 3.9 | 12.8 | 362 | 21.4 | 0.3819 | 0.35 | 1.9 |
| Comparative example 20 | 63 | 2.4 | 11.2 | 327 | 18.9 | 0.4215 | 0.32 | 4.4 |
| Example 21 | 87 | 7.5 | 25.5 | 561 | 57.3 | 0.2264 | 0.18 | 1.4 |
| Comparative example 21 | 82 | 6.4 | 23.2 | 513 | 53.1 | 0.3469 | 0.14 | 5 |
| Example 22 | 87 | 6.7 | 22.8 | 363 | 57.7 | 0.1583 | 0.36 | 2 |
| Comparative example 22 | 82 | 6.3 | 21.1 | 322 | 55.1 | 0.1851 | 0.32 | 3.3 |

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a graphene oxide/white carbon black/rubber nanocomposite material, the method comprising:
   a) dispersing graphene oxide in deionized water and then ultrasonicating at 0.1-1000 kw for 10 min-6 h to obtain a hydrosol of graphene oxide containing 0.01-20 wt % of graphene oxide;
   b) adding white carbon black and a coupling agent, or white carbon black modified with a coupling agent, into the hydrosol of graphene oxide of a) and then ultrasonicating at 0.1-1000 kw for 10 min-6 h or stirring at 50-10000 r/min for 30 min-12 h to obtain a hydrosol of graphene oxide/white carbon black;
   c) adding a surfactant into the hydrosol of graphene oxide/white carbon black of b) and ultrasonicating at 0.1-1000 kw for 10 min-6 h or stirring at 50-10000 r/min for 30 min-12 h to obtain a pre-treated hydrosol of graphene oxide/white carbon black;
   d) mixing the hydrosol of graphene oxide/white carbon black of b), or the pre-treated hydrosol of graphene oxide/white carbon black of c), with a rubber latex and then ultrasonicating at 0.1-1000 kw for 10 min-6 h or stirring at 50-10000 r/min for 30 min-12 h to obtain a stable mixture emulsion; and
   e) adding a flocculant into the mixture emulsion of d) to induce flocculation and stirring at 50-10000 r/min to obtain floc, and then drying the floc at 60-300° C. to remove water therefrom to obtain a graphene oxide/white carbon black/rubber nanocomposite material;
   wherein:
   when temperature during ultrasonication of a)-d) exceeds 80° C., stopping ultrasonication and stirring mixtures at 50-500 r/min for 5-30 min until the temperature decreases to allow resuming ultrasonication; and
   temperatures during a)-d) are below 100° C.

2. The method of claim 1, wherein:
   a ratio of a weight of the white carbon black to a weight of the rubber is 0.1-400 phr, phr is a unit defined as 1 weight part of the white carbon black with respect to 100 weight parts of the rubber; and
   a ratio of a weight of the graphene oxide to a weight of the rubber is 0.1-400 phr, phr is a unit defined as 1 weight part of the graphene oxide with respect to 100 weight parts of the rubber.

3. The method of claim 1, wherein a ratio of a weight of the graphene oxide to a weight of the rubber is 0.05-20 phr, phr is a unit defined as 1 weight part of the graphene oxide with respect to 100 weight parts of the rubber.

4. The method of claim 1, wherein:
   the rubber latex is styrene-butadiene rubber latex, natural rubber latex, chloroprene rubber latex, butyl rubber latex, nitrile rubber latex, polybutadiene latex, ethylene propylene rubber latex, polyisoprene latex, fluoroelastomer latex, silicone latex, or a mixture thereof; and
   the rubber latex has a solid content of 10-80 wt %.

5. The method of claim 1, wherein:
   the flocculant is nitric acid, sulfuric acid, hydrochloric acid, hydrobromic acid, hydrofluoric acid, calcium chloride, sodium chloride, potassium chloride, sodium sulfate, aluminum sulfate, ferric chloride, or aluminum chlorohydrate.

6. The method of claim 1, wherein:
   the coupling agent is bis[γ-(triethoxysilyl)propyl]tetrasulfide, bis[γ-(triethoxysilyl)propyl]disulfide, (γ-aminopropyl)triethoxysilane, (γ-glycidyloxypropyl)trimethoxysilane, [γ-(methacryloyloxy)propyl]trimethoxysilane, (γ-mercaptopropyl)trimethoxysilane, stearic acid, or silazane; and
   a weight percent of the coupling agent with respect to the white carbon black is 0.01-50%.

7. The method of claim 1, wherein:
   the surfactant is carboxylated polybutadiene, (3-aminopropyl)triethoxysilane, [γ-(methacryloxy)propyl]trimethoxysilane, quaternary ammonium salt, carboxylated styrene-butadiene rubber latex having a solid content of 10-80 wt %, butadiene-vinyl pyridine rubber latex having a solid content of 10-80 wt %, carboxylated styrene-butadiene-vinyl pyridine rubber latex having a solid content of 10-80 wt %, epoxy natural rubber latex having a solid content of 10-80 wt %, carboxylated chloroprene rubber latex having a solid content of 10-80 wt %, or carboxylated nitrile rubber latex having a solid content of 10-80 wt %; and
   a ratio of a weight of the surfactant to a weight of the rubber is 0-100 phr, phr is a unit defined as 1 weight part of the surfactant with respect to 100 weight parts of the rubber.

8. A method for preparing a graphene oxide/white carbon black/rubber nanocomposite material, the method comprising:
   a) dispersing graphene oxide in deionized water and then ultrasonicating at 0.1-1000 kw for 10 min-6 h to obtain a hydrosol of graphene oxide containing 0.01-20 wt % of graphene oxide;
   b) adding white carbon black and a coupling agent, or white carbon black modified with a coupling agent, into the hydrosol of graphene oxide of a) and then ultrasonicating at 0.1-1000 kw for 10 min-6 h or stirring at 50-10000 r/min for 30 min-12 h to obtain a hydrosol of graphene oxide/white carbon black;
   c) adding a surfactant into the hydrosol of graphene oxide/white carbon black of b) and ultrasonicating at 0.1-1000 kw for 10 min-6 h or stirring at 50-10000 r/min for 30 min-12 h to obtain a pre-treated hydrosol of graphene oxide/white carbon black;
   d) mixing the hydrosol of graphene oxide/white carbon black of b), or the pre-treated hydrosol of graphene oxide/white carbon black of c), with a rubber latex and then ultrasonicating at 0.1-1000 kw for 10 min-6 h or stirring at 50-10000 r/min for 30 min-12 h to obtain a stable mixture emulsion; and
   e) passing the mixture emulsion of d) through a spray dryer with a carrier gas to atomize the mixture emulsion of d) into tiny drops, and then dehydrating the tiny drops in a drying medium to obtain a graphene oxide/white carbon black/rubber nanocomposite material;
   wherein:
   when temperature during ultrasonication of a)-d) exceeds 80° C., stopping ultrasonication and stirring mixtures at 50-500 r/min for 5-30 min until the temperature decreases to allow resuming ultrasonication; and
   temperature during a)-d) are below 100° C.

9. The method of claim 8, wherein:
a ratio of a weight of the white carbon black to a weight of the rubber is 0.1-400 phr, phr is a unit defined as 1 weight part of the white carbon black with respect to 100 weight parts of the rubber; and
a ratio of a weight of the graphene oxide to a weight of the rubber is 0.1-400 phr, phr is a unit defined as 1 weight part of the graphene oxide with respect to 100 weight parts of the rubber.

10. The method of claim 8, wherein a ratio of a weight of the graphene oxide to a weight of the rubber is 0.05-20 phr, phr is a unit defined as 1 weight part of the graphene oxide with respect to 100 weight parts of the rubber.

11. The method of claim 8, wherein:
the rubber latex is styrene-butadiene rubber latex, natural rubber latex, chloroprene rubber latex, butyl rubber latex, nitrile rubber latex, polybutadiene latex, ethylene propylene rubber latex, polyisoprene latex, fluoroelastomer latex, silicone latex, or a mixture thereof; and
the rubber latex has a solid content of 10-80 wt %.

12. The method of claim 8, wherein:
the spray dryer has an input temperature of from 100 to 350° C. and an output temperature of from 70 to 120° C.; and
the dry medium is heated air.

13. The method of claim 8, wherein:
the carrier gas comprises a gasified flocculant; and
the gasified flocculant is nitric acid, hydrobromic acid, hydrofluoric acid, hydrochloric acid, or sulfuric acid.

14. The method of claim 8, wherein:
the coupling agent is bis[γ-(triethoxysilyl)propyl]tetrasulfide, bis[γ-(triethoxysilyl)propyl]disulfide, (γ-aminopropyl)triethoxysilane, (γ-glycidyloxypropyl)trimethoxysilane, [γ-(methacryloyloxy)propyl]trimethoxysilane, (γ-mercaptopropyl)trimethoxysilane, stearic acid, or silazane; and
a weight percent of the coupling agent with respect to the white carbon black is 0.01-50%.

15. The method of claim 8, wherein:
the surfactant is carboxylated polybutadiene, (3-aminopropyl)triethoxysilane, [γ-(methacryloxy)propyl]trimethoxysilane, quaternary ammonium salt, carboxylated styrene-butadiene rubber latex having a solid content of 10-80 wt %, butadiene-vinyl pyridine rubber latex having a solid content of 10-80 wt %, carboxylated styrene-butadiene-vinyl pyridine rubber latex having a solid content of 10-80 wt %, epoxy natural rubber latex having a solid content of 10-80 wt %, carboxylated chloroprene rubber latex having a solid content of 10-80 wt %, or carboxylated nitrile rubber latex having a solid content of 10-80 wt %; and
a ratio of a weight of the surfactant to a weight of the rubber is 0-100 phr, phr is a unit defined as 1 weight part of the surfactant with respect to 100 weight parts of the rubber.

16. A method for preparing a graphene oxide/white carbon black/rubber nanocomposite material, the method comprising one of the following four processes:
1) masticating a masterbatch of graphene oxide prepared from emulsion method in a two roll mixing mill or an internal mixer for 1-5 min, and then adding white carbon black and a surfactant, or white carbon black modified with a surfactant, into the masterbatch of graphene oxide and mixing for 1-20 min to obtain a graphene oxide/white carbon black/rubber nanocomposite material;
2) masticating a masterbatch of white carbon black prepared from emulsion method in a two roll mixing mill or an internal mixer for 1-5 min, and then adding graphene oxide and a surfactant into the masterbatch of white carbon black and mixing for 1-20 min to obtain a graphene oxide/white carbon black/rubber nanocomposite material;
3) masticating dry rubber in a two roll mixing mill or an internal mixer for 1-5 min, and then adding white carbon black modified with a coupling agent, graphene oxide, and a surfactant, or adding a mixture of white carbon black, a coupling agent, graphene oxide, and a surfactant, into the dry rubber and mixing for 1-20 min to obtain a graphene oxide/white carbon black/rubber nanocomposite material; and
4) masticating a masterbatch of graphene oxide prepared from emulsion method and a masterbatch of white carbon black prepared from emulsion method in a two roll mixing mill or an internal mixer for 1-20 min to obtain a graphene oxide/white carbon black/rubber nanocomposite material;
wherein the masterbatch of graphene oxide comprises graphene oxide and a first rubber, and the masterbatch of white carbon black comprises white carbon black and a second rubber.

17. The method of claim 16, wherein:
the first rubber and the second rubber independently represent styrene-butadiene rubber, natural rubber, chloroprene rubber, butyl rubber, nitrile rubber, polybutadiene, ethylene propylene rubber, polyisoprene, fluoroelastomer, silicone, or a mixture thereof; and
the dry rubber is styrene-butadiene rubber, natural rubber, chloroprene rubber, butyl rubber, nitrile rubber, polybutadiene, ethylene propylene rubber, polyisoprene, fluoroelastomer, silicone, or a mixture thereof.

18. The method of claim 16, wherein the coupling agent is bis[γ-(triethoxysilyl)propyl]tetrasulfide, bis[γ-(triethoxysilyl)propyl]disulfide, (γ-aminopropyl)triethoxysilane, (γ-glycidyloxypropyl)trimethoxysilane, [γ-(methacryloyloxy)propyl]trimethoxysilane, (γ-mercaptopropyl)trimethoxysilane, stearic acid, or silazane; and an amount of the coupling agent is 0.01-50% by weight of the white carbon black.

19. The method of claim 16, wherein the surfactant is carboxylated polybutadiene, (3-aminopropyl)triethoxysilane, [γ-(methacryloxy)propyl]trimethoxysilane, quaternary ammonium salt, carboxylated styrene-butadiene rubber latex having a solid content of 10-80 wt. %, butadiene-vinyl pyridine rubber latex having a solid content of 10-80 wt. %, carboxylated styrene-butadiene-vinyl pyridine rubber latex having a solid content of 10-80 wt. %, epoxy natural rubber latex having a solid content of 10-80 wt. %, carboxylated chloroprene rubber latex having a solid content of 10-80 wt. %, or carboxylated nitrile rubber latex having a solid content of 10-80 wt. %.

20. The method of claim 16, wherein the method further comprises preparing the masterbatch of graphene oxide through:
a) dispersing graphite oxide in deionized water and ultrasonicating graphene oxide to obtain a hydrosol of graphene oxide;
b) adding a surfactant to the hydrosol of graphene oxide, and ultrasonicating or stirring to obtain a hydrosol of graphene oxide pre-treated by the surfactant;
c) mixing the hydrosol of graphene oxide obtained in a) or the hydrosol of graphene oxide pre-treated by the surfactant obtained in b) with a latex of the first rubber, and ultrasonicating or stirring to obtain an emulsion of graphene oxide and the first rubber; and
d) preparing the masterbatch of graphene oxide from the emulsion through ionic flocculation or spray drying.

21. The method of claim 20, wherein ultrasonicating graphene oxide in step a) comprises ultrasonicating at between 10 and 2000 kw and between 10 and 20000 Hz for between 10 min and 6 h.

22. The method of claim 20, wherein ultrasonicating in step b) comprises ultrasonicating for between 5 min and 5 h.

23. The method of claim 20, wherein stirring in step b) comprises stirring at between 50 and 10000 r/min for between 5 min and 5 h.

24. The method of claim 20, wherein ultrasonicating in step c) comprises ultrasonicating for between 10 min and 6 h.

25. The method of claim 20, wherein stirring in step c) comprises stirring at between 50 and 10000 r/min for between 10 min and 6 h.

26. The method of claim 20, wherein the ionic flocculation in step d) comprises adding a flocculant into the emulsion to induce flocculation and to obtain flocs of graphene oxide and the first rubber, and drying the flocs to obtain the masterbatch of graphene oxide.

27. The method of claim 20, wherein the spray drying in step d) comprises atomizing the emulsion into tiny drops by passing through a spry dryer, and dehydrating the drops in a drying medium to obtain the masterbatch of graphene oxide.

28. The method of claim 16, wherein the method further comprises preparing the masterbatch of white carbon black through:
  a) dispersing white carbon black and a coupling agent, or white carbon black modified by a coupling agent in deionized water to obtain a pulp of white carbon black;
  b) mixing the pulp with a latex of the second rubber to obtain a liquid mixture of white carbon black and the second rubber; and
  c) preparing the masterbatch of white carbon black from the liquid mixture through ionic flocculation or spray drying.

29. The method of claim 28, wherein the ionic flocculation in step c) comprises adding a flocculant into the liquid mixture to induce flocculation and to obtain flocs of white carbon black and the second rubber, and drying the flocs of white carbon black and the second rubber to obtain the masterbatch of white carbon black.

30. The method of claim 28, wherein the spray drying in step d) comprises atomizing the liquid mixture into tiny drops by passing through a spry dryer, and dehydrating the drops in a drying medium to obtain the masterbatch of white carbon black.

* * * * *